US012803618B2

(12) United States Patent
Houdebine et al.

(10) Patent No.: US 12,803,618 B2
(45) Date of Patent: Nov. 17, 2026

(54) CONTACTLESS COMMUNICATION DEVICE BY ACTIVE LOAD MODULATION

(71) Applicant: STMicroelectronics International N.V., Geneva (CH)

(72) Inventors: Marc Houdebine, Crolles (FR); Sylvain Majcherczak, St. Pierre D+3 Allevard (FR); Florent Sibille, Grenoble (FR)

(73) Assignee: STMicroelectronics International N.V., Geneva (CH)

( * ) Notice: Subject to any disclaimer, the term of this patent is extended or adjusted under 35 U.S.C. 154(b) by 232 days.

(21) Appl. No.: 18/886,196

(22) Filed: Sep. 16, 2024

(65) Prior Publication Data

US 2025/0105875 A1 Mar. 27, 2025

(30) Foreign Application Priority Data

Sep. 22, 2023 (FR) ....................................... 2310038

(51) Int. Cl.

| | |
|---|---|
| ***H04B 5/20*** | (2024.01) |
| ***G06K 19/07*** | (2006.01) |
| ***H04B 5/48*** | (2024.01) |
| ***H04B 5/77*** | (2024.01) |
| ***H04B 17/12*** | (2015.01) |
| ***H04B 17/27*** | (2015.01) |
| ***H04L 7/00*** | (2006.01) |

(52) U.S. Cl.
CPC ................. *H04B 5/20* (2024.01); *H04B 5/48* (2024.01)

(58) Field of Classification Search
None
See application file for complete search history.

(56) References Cited

U.S. PATENT DOCUMENTS

| | | | | |
|---|---|---|---|---|
| 9,985,732 | B2 * | 5/2018 | Cordier | G06K 7/0095 |
| 10,243,767 | B2 * | 3/2019 | Nakano | G06K 19/07 |
| 10,334,421 | B2 * | 6/2019 | Cho | G06K 7/10237 |
| 10,721,604 | B2 * | 7/2020 | Hueber | H04B 17/318 |
| 11,128,347 | B2 * | 9/2021 | Holweg | G08C 17/02 |
| 12,424,739 | B2 * | 9/2025 | Jamin | H01Q 3/267 |
| 2010/0176659 | A1 | 7/2010 | Aoyama et al. | |

(Continued)

FOREIGN PATENT DOCUMENTS

CN 112532551 A 3/2021

OTHER PUBLICATIONS

INPI Search Report and Written Opinion for priority application, FR Appl. No. 2310038, report dated Mar. 11, 2024, 12 pgs.

*Primary Examiner* — Pablo N Tran
(74) *Attorney, Agent, or Firm* — Crowe & Dunlevy LLC

(57) ABSTRACT

A device of contactless communication by active load modulation includes a receive circuit configured to receive as an input a reception signal originating from an electromagnetic field intended to be received by an antenna and to deliver as an output a first clock signal. A transmit circuit includes an output coupled to the antenna and operates to deliver on its output a modulation signal in phase with the reception signal. A compensation circuit is configured to compensate for a first delay of the first clock signal due to the receive circuit and to the amplitude of the reception signal. The compensation circuit operates to determine a phase-shift value to be applied to an input signal of the transmit circuit to compensate for the first delay.

14 Claims, 4 Drawing Sheets

(56) References Cited

U.S. PATENT DOCUMENTS

| | | | | |
|---|---|---|---|---|
| 2016/0241380 | A1* | 8/2016 | Ghahramani | H04B 5/45 |
| 2018/0034510 | A1 | 2/2018 | Hueber et al. | |
| 2018/0287669 | A1* | 10/2018 | Nakano | H04B 1/59 |
| 2019/0074914 | A1* | 3/2019 | Hueber | H04B 17/12 |
| 2020/0356736 | A1 | 11/2020 | Cordier et al. | |

* cited by examiner

CONTACTLESS COMMUNICATION DEVICE BY ACTIVE LOAD MODULATION

PRIORITY CLAIM

This application claims the priority benefit of French Application for Patent No. 2310038, filed on Sep. 22, 2023, the content of which is hereby incorporated by reference in its entirety to the maximum extent allowable by law.

TECHNICAL FIELD

The present disclosure generally concerns the field of wireless communications between a reader and a device of contactless communication by active load modulation, in particular between a reader and such a device in card emulation (CE) mode. The present disclose may, in particular, concern the field of contactless communications implemented in Near Field Communication (NFC) technology.

BACKGROUND

Near-field communication (NFC) is a technology of wireless connectivity allowing a communication over a short distance, for example in the order of some ten centimeters, between electronic devices, such as for example a contactless chip card and a reader, or a card emulation (CE) device (for example a cell phone or a connected object) and a reader.

A contactless communication device is a device capable of exchanging information via an antenna with another contactless device, for example a reader, according to a contactless communication protocol.

An NFC device, which is a contactless device, is a device compatible with the NFC technology. The NFC technology is an open technological platform standardized in the ISO/IEC 18092 and ISO/IEC 21481 standard, but incorporates many already-existing standards such as for example the type-A and type-B protocols defined in the ISO-14443 standard, which may be communication protocols usable in the NFC technology.

A CE device may be used to exchange information with another contactless device, for example a contactless reader, by using a contactless communication protocol usable in the NFC technology.

During a transmission of information between a reader and a CE device or a NFC card, the reader generates an electromagnetic field via its antenna, which is generally, according to the conventionally used standards, a sine wave having a frequency equal to 13.56 MHz. Each of the NFC devices (reader and CE device) transmits data by using a modulation scheme, for example an amplitude shift keying (ASK) modulation.

Two operating modes are possible: a passive mode, which corresponds to the mode used by a NFC card, or an active mode, which generally corresponds to the mode used by a CE device.

In the passive mode, also referred to as passive load modulation (PLM), only the reader generates the electromagnetic field and the card is then passive. The antenna of the card modulates the electromagnetic field generated by the reader via a modification of a load connected across the card antenna, which modifies the output impedance of the reader antenna due to the magnetic coupling between the two antennas. This results in a change in the amplitudes and/or the phases of the voltages and currents present at the antennas of the reader and of the card. The information is thus transmitted from the card to the reader by load modulation to the antenna currents of the reader.

In the active mode, also referred to as active load modulation (ALM), the reader and the CE device both generate an electromagnetic field. This operating mode is used when the CE device is provided with a specific power source, for example a battery.

Generally, a CE device comprises an antenna smaller than that of a NFC card, and this is the reason why an active load modulation is generally used in such a device.

During an active load modulation, the electromagnetic fields emitted by the reader and the CE device are in phase with each other so that the detection sensitivity of the device is not decreased. The CE device may, in particular, comprise a receive circuit, for example including a variable gain amplifier (VGA), and a converter of a sinusoidal signal into a square signal enabling to extract from the field generated by the reader a clock signal used to synchronize in phase a phase-locked loop (PLL) particularly used to compensate for the propagation delay in the receive circuit.

The VGA and the converter are, however, subject to Process, Voltage, Temperature (PVT) variations capable of generating a delay or an advance of the received signal, resulting in a phase shift between the electromagnetic field emitted by the reader and that emitted by the CE device. The amplitude variations of the electromagnetic field emitted by the reader and/or of the coupling between the antennas of the reader and of the CE device may also contribute to this phase-shift, given that the delay of transmission of the signal through the receive circuit also varies according to the amplitude of the received electromagnetic field and thus to the coupling between the antennas of the reader and of the CE device.

There exists a need to provide a solution enabling to address the problems encountered with existing solutions.

SUMMARY

An embodiment which overcomes all or part of the previously-mentioned disadvantages, provides a device of contactless communication by active load modulation comprising: a receive circuit configured to receive as an input a reception signal originating from an electromagnetic field intended to be received by an antenna and to deliver as an output a first clock signal; a transmit circuit comprising an output coupled to the antenna and intended to deliver on its output a modulation signal in phase with the reception signal; a circuit for compensating for a first delay of the first clock signal due to the receive circuit and to the amplitude of the reception signal, configured to determine a phase-shift value to be applied to an input signal of the transmit circuit to compensate for the first delay.

According to an embodiment, the receive circuit comprises at least: a variable gain amplifier configured to receive as an input the reception signal; a converter of a sinusoidal signal into a square signal, comprising an input coupled to an output of the variable gain amplifier, and an output having the first clock signal intended to be delivered thereon.

According to an embodiment, the device further comprises a phase-locked loop configured to receive as an input the first clock signal and the phase-shift value, and to deliver on a first output the input signal of the transmit circuit.

According to an embodiment, the compensation circuit comprises at least one lookup table configured to store a plurality of phase-shift values, each associated with an amplitude value of the reception signal, and to deliver as an output one of the phase-shift values according to a value of a control signal applied at the input of the lookup table and having its value depending on the amplitude of the reception signal.

According to an embodiment, the compensation circuit further comprises: an analog-to-digital converter comprising an input coupled to the output of the variable gain amplifier; a first computing circuit comprising an input coupled to an output of the analog-to-digital converter, and configured to determine the amplitude value of the reception signal and to deliver as an output the control signal having its value depending on the determined amplitude value of the reception signal.

According to an embodiment, the output of the first computing circuit is coupled to a gain control input of the variable gain amplifier.

According to an embodiment, the compensation circuit comprises at least one circuit for measuring a phase difference between the first clock signal and a second clock signal synchronous with the reception signal.

According to an embodiment, the measurement circuit comprises at least: a counting trigger circuit comprising two inputs having the first and second clock signals intended to be applied thereto, and configured to deliver as an output a counting trigger signal having a first value for a time period equal to the first delay and a second value, different from the first value, outside of this time period; a counter comprising a clock input coupled to an output of the counting trigger circuit, and a data input coupled to a second output of the phase-locked loop on which a periodic signal having a frequency equal to a multiple of that of the input signal of the transmit circuit is intended to be delivered; a second computing circuit configured to determine the phase-shift value according to a value of a counting signal intended to be delivered by the counter.

According to an embodiment, the compensation circuit further comprises a buffer memory circuit configured to receive as an input the second clock signal and comprising an output coupled to one of the two inputs of the counting trigger circuit.

Another embodiment provides a method of calibration of a device such as defined hereabove, comprising at least the implementation of the following steps: application of a reception signal at the input of the receive circuit of the device; computing and storage, by the compensation circuit of the device, of a phase-shift value which is a function of the amplitude of the reception signal; and wherein steps a) and b) are repeated a plurality of times by modifying, at each repetition, an amplitude value of the reception signal.

According to an embodiment, steps a) and b) are repeated by scanning a range of amplitude values of the reception signal ranging from a minimum value to a maximum value expected for this amplitude.

According to an embodiment, for each amplitude value of the reception signal, steps a) and b) are repeated a plurality of times by modifying, at each repetition, a value of a power supply voltage of the device and/or a value of a temperature of the device.

Another embodiment provides a method of contactless communication between a reader and a device such as defined hereabove, comprising at least the implementation of the following steps: detection of an electromagnetic field by the device; when an electromagnetic field is detected by the device, transmission of a first clock signal by the receive circuit of the device receiving as an input a reception signal originating from the electromagnetic field; application, by the compensation circuit of the device, of a phase-shift value to a signal applied at the input of the transmit circuit of the device, the applied phase-shift value being intended to compensate for a first delay of the first clock signal due to the receive circuit and to the amplitude of the reception signal and being dependent on the amplitude of the reception signal; application to the antenna, by the transmit circuit of the device, of a modulation signal in phase with the reception signal.

According to an embodiment, the receive circuit of the device comprises at least one variable gain amplifier configured to receive as an input the reception signal, and further comprising, before the application of the phase-shift value to the signal applied at the input of the transmit circuit of the device, a control of the gain of the variable gain amplifier by the compensation circuit, the selected value of the gain being a function of the amplitude of the reception signal.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the forming of the different elements and circuits (variable gain amplifier, converter of a sinusoidal signal into a square signal, phase-locked loop, lookup table, analog-to-digital converter, computing circuit, delay circuit, flip-flops, counters, etc.) of the device is not described in detail. It will be within the abilities of those skilled in the art to implement in detailed fashion the different functions of the device based on the functional description given herein.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

Unless specified otherwise, the expressions "about", "approximately", "substantially", and "in the order of" signify plus or minus 10%, preferably of plus or minus 5%.

Figure 1:
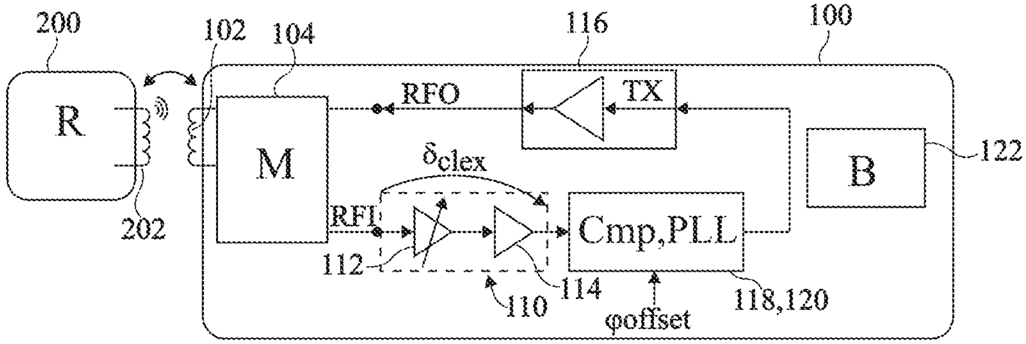
FIG. 1 schematically shows an example of a device of contactless communication by active load modulation communicating with a contactless reader.

An example of a device 100 of contactless communication by active load modulation according to a specific embodiment is described hereafter in relation with FIG. 1.

Device 100 is of NFC type, that is, is configured to use a communication protocol compatible with the NFC technology. In the described example, device 100 corresponds to a device in card emulation mode (CE). In FIG. 1, device 100 is shown during a communication with an NFC-type contactless reader (R) 200.

In the described example, device 100 comprises an antenna 102 intended to exchange data with an antenna 202 of reader 200 via the emitting of electromagnetic fields by these antennas 102, 202 and the magnetic coupling of these antennas 102, 202.

In the specific configuration shown in FIG. 1, device 100 further comprises a matching circuit (M) 104 coupled between antenna 102 and the other elements of device 100. Circuit 104 may, in particular, be used to match the impedance of antenna 102 to interface the input and output signals of antenna 102.

Device 100 further comprises a receive circuit 110 configured to receive as an input a reception signal originating from an electromagnetic field intended to be received by antenna 102 and to deliver as an output a first clock signal. In FIG. 1, the reception signal is referred to as "RFI" and corresponds to a sinusoidal signal. The frequency of signal RFI is, for example, equal to 13.56 MHz.

In a specific configuration corresponding to that shown in FIG. 1, receive circuit 110 comprises at least: a variable gain amplifier (VGA) 112 configured to receive as an input signal RFI; and a converter 114 of a sinusoidal signal into a square signal, comprising an input coupled to an output of VGA 112, and an output having the first clock signal intended to be delivered thereon.

In this specific configuration, the signal transmitted from the output of converter 114 corresponds to a square signal having an amplitude greater than that of signal RFI, that is, corresponds to the transformation of signal RFI into a square signal amplified with a gain higher than 1.

As a variant, receive circuit 110 may comprise additional elements and/or elements different from those of the example embodiment of FIG. 1.

Device 100 further comprises a transmit circuit 116 comprising an output coupled to circuit 104 and which is intended to deliver on this output a modulation signal referred to as "RFO" to antenna 102. This signal RFO includes information intended to be transmitted by device 100 to reader 200. Signal RFO is intended to be in phase with signal RFI.

Device 100 further comprises a compensation circuit (Cmp) 118 for compensating for a first delay $\delta_{clex}$ of the first clock signal due to receive circuit 110, including the delay due to at least part of the PVT variations of the components of receive circuit 110, and to the amplitude of signal RFI. When device 100 is communicating with reader 200, the amplitude of reception signal RFI may be directly proportional to that of the electromagnetic field received by antenna 102 and thus of the coupling between antennas 102, 202. Compensation circuit 118 is configured to determine a phase-shift value to be applied to an input signal of transmit circuit 116 to compensate for first delay $\delta_{clex}$.

In the specific configuration shown in FIG. 1, device 100 further comprises a phase-locked loop (PLL) 120 intended to synchronize signal RFO with the received Signal RFI, and thus to compensate for the delays due to the processing of the signals in the different circuits and elements of device 100. This PLL 120 is configured to receive as an input the first clock signal delivered by receive circuit 110 as well as the phase-shift value determined by compensation circuit 118, and to deliver on a first output the input signal of transmit circuit 116. Thus, PLL 120 is here configured to take into account the phase-shift value determined by compensation circuit 118 so that the signal delivered from the output of PLL 120 to transmit circuit 116 no longer comprises a phase-shift, or delay, due to receive circuit 110 and to the amplitude of reception signal RFI.

In the diagram of FIG. 1, only some of the elements of device 100 are shown. Device 100 comprises, in addition to those shown in FIG. 1, other circuits and elements not described herein, such as for example circuits for modulating and demodulating the data received and transmitted by device 100.

In the configuration shown in FIG. 1, device 100 further comprises a battery (B) 122 intended to electrically power different circuits and components of device 100.

Figure 2:
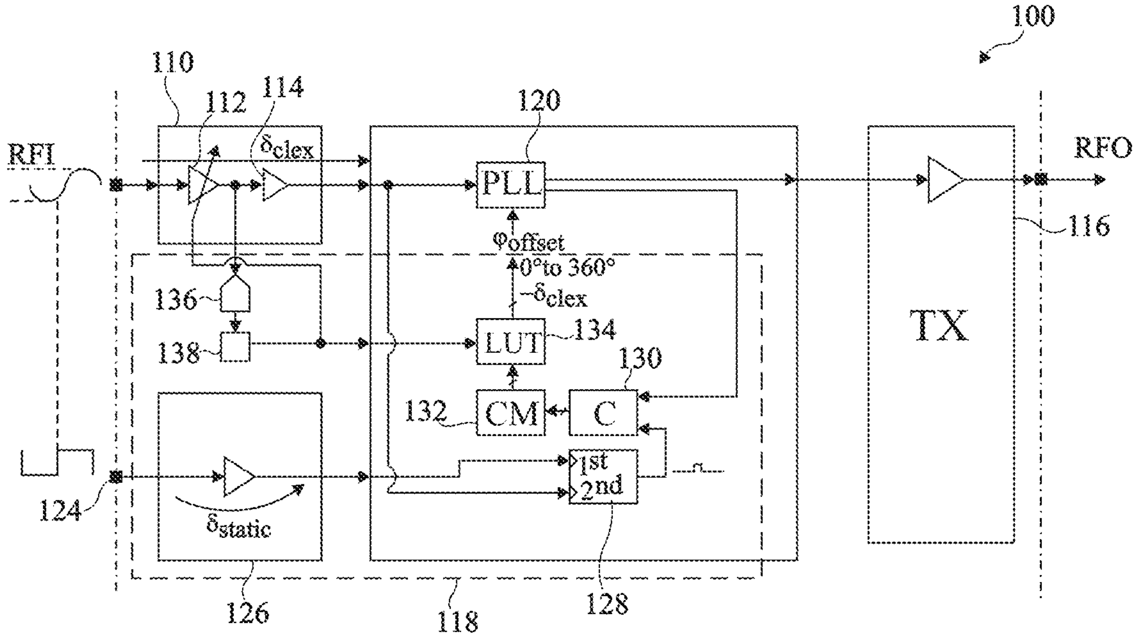
FIG. 2 schematically shows details of an example of a device of contactless communication by active load modulation.

A more detailed example of device 100 is described hereafter in relation with FIG. 2. In FIG. 2, only part of the components and circuits of the device 100 are shown and described hereafter. For example, as compared with FIG. 1, the antenna 102 and the circuit 104 of device 100 are not shown in FIG. 2.

In this example, device 100 comprises an input 124 having a square signal, of same frequency as signal RFI and in phase with signal RFI, intended to be applied thereto during a method of calibration of device 100 which will be described hereafter. This square signal applied to input 124 during the calibration method is, for example, delivered by a calibrated oscillator having its output coupled to input 124 during the method of calibration of device 100.

In the example of FIG. 2, compensation circuit 118 comprises a buffer memory circuit 126, or buffer, allowing a good propagation of the signal received on input 124 during the calibration of device 100. This circuit 126 applies a second delay referred to as $\delta_{static}$ and having a value much lower than that of first delay $\delta_{clex}$. The value of second delay $\delta_{static}$ does not depend on the amplitude of the reception signal and can be considered as static, or constant, during the calibration of device 100. The signal delivered as an output of circuit 126 forms a second clock signal with which the first clock signal delivered as an output of receive circuit 110 will be compared to be able to determine the phase-shift enabling to compensate for the first delay.

As a variant, the second clock signal could be obtained in a way different from that described herein.

In the described example, compensation circuit 118 further comprises a circuit for measuring a phase difference between the first and second clock signals.

In a specific configuration corresponding to that shown in FIG. 2, this measurement circuit comprises: a counting trigger circuit 128 comprising two inputs having the first and second clock signals intended to be applied thereto, and configured to deliver as an output a counting trigger signal having a first value for a time period equal to the first delay and a second value, different from the first value, outside of this time period; a counter (C) 130 comprising a clock input coupled to an output of circuit 128, and a data input coupled to a second output of PLL 120 on which a periodic signal having a frequency equal to a multiple of that of the input signal of transmit circuit 116 is intended to be delivered; and a computing circuit (CM) 132 configured to determine the phase-shift value to be applied according to a value of a counting signal intended to be delivered by counter 130, the output of counter 130 being coupled to an input of computing circuit 132.

The value of the frequency of the periodic signal delivered on the second output of PLL 120 may depend on the components of PLL 120, and for example on the operating frequency of an oscillator present in PLL 120. For example, the frequency of the reception signal and the frequency of the input signal of transmit circuit 116 may be equal to 13.56 MHz, and the frequency of the periodic signal delivered on the second output of PLL 120 may be equal to approximately 868 MHz (64*13.56 MHz).

This example of measurement circuit thus provides measuring the phase difference between the first and second clock signals, which is representative of first delay $\delta_{clex}$, via a counting, the result of which will be representative of this phase difference and thus of this first delay $\delta_{clex}$.

As a variant, the function fulfilled by the measurement circuit could be obtained by using circuits and components different from those described hereabove.

In the described example, compensation circuit 118 further comprises a lookup table (LUT) 134 configured to store a plurality of phase-shift values, each associated with an amplitude value of the reception signal. These phase-shift values may be sent from the output of computing circuit 132, which is coupled to one of the inputs of lookup table 134. LUT 134 further comprises an output on which one of the stored phase-shift values is intended to be delivered to PLL 120, this value being selected from among those stored according to the value of a control signal intended to be applied to the input of LUT 134. As described hereafter, the value of this control signal, and thus the phase-shift value delivered as an output of LUT 134, will be a function of the amplitude value of the reception signal received by receive circuit 110.

In the example described in relation with FIG. 2, compensation circuit 118 further comprises: an analog-to-digital converter (ADC) 136 comprising an input coupled to the output of VGA 112; and another computing circuit 138 comprising an input coupled to an output of ADC 136, and configured to determine the amplitude value of the reception signal and to deliver as an output the control signal having its value depending on the determined amplitude value of the reception signal.

An output of computing circuit 138 is coupled to a second input of LUT 134. Thus, according to the value supplied on this second input, that is, to the determined amplitude value of the reception signal, LUT 134 may deliver as an output one of the stored phase-shift values, which corresponds to that stored for this amplitude value. In FIG. 2, this phase-shift value delivered by lookup table 134 is referred to as "$\varphi_{offset}$" and enables to compensate for the first delay $\delta_{clex}$ (compensation symbolized by the indication "$-\delta_{clex}$" at the output of LUT 134).

As a variant, circuits different from the circuits 136 and 138 described hereafter may be used to fulfill similar functions.

In the described example, the output of computing circuit 138 is also coupled to a gain control input of VGA 112. Thus, according to the value of the amplitude of the reception signal, the gain of VGA 112 can be adjusted.

During a method of calibration of device 100, the following steps may be implemented: a) application of a reception signal as an input of the receive circuit 110 of device 100; and b) computing and storage, by compensation circuit 118, of a phase-shift value which is a function of the amplitude of the reception signal.

These steps a) and b) are repeated a plurality of times by modifying, at each repetition, an amplitude value of the reception signal. These steps may, in particular, be repeated by scanning a range of amplitude values of the reception signal ranging from a minimum value to a maximum value expected for this amplitude.

Thus, this calibration method enables to associate and store, in LUT 134, a plurality of phase-shift values according to a plurality of amplitude values of the reception signal.

Figure 3:
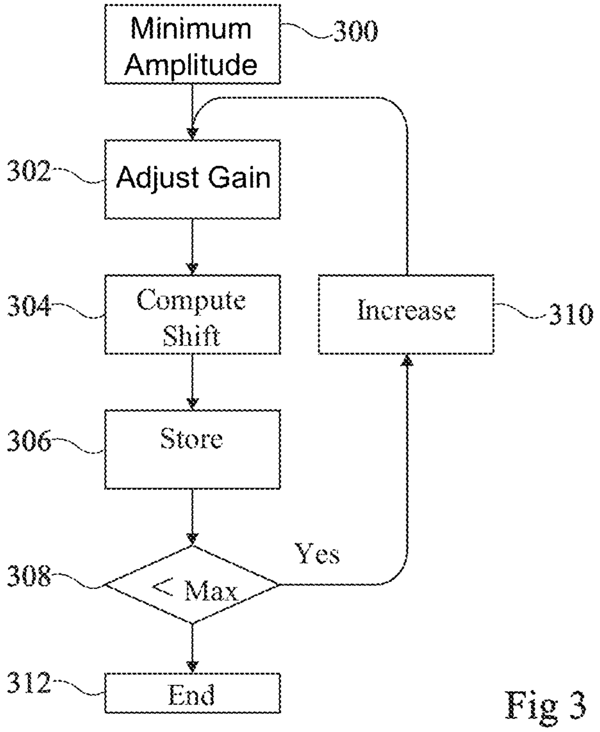
FIG. 3 schematically shows steps of an example of a method of calibrating a device of contactless communication by active load modulation.

FIG. 3 schematically shows the steps of an example of a method of calibration of device 100.

During an initial step 300, a reception signal of minimum amplitude is applied to the input of receive circuit 110, either, preferably, via a wiring directly coupled to the card having device 100 formed thereon, for example during an industrial test during the manufacturing of device 100, or via the application of a minimum electromagnetic field detected by antenna 102, for example during a test performed with the final device 100. This minimum amplitude is, for example, in the range from 1 mV to 100 mV.

This reception signal is amplified by VGA 112, digitally converted by ADC 136 and processed by computing circuit 138. The gain of VGA 112 is automatically adjusted according to the amplitude of the reception signal (step 302).

The first clock signal is obtained at the output of converter 114, after which its phase is compared, by circuit 128, with that of the second clock signal applied to input 124 and placed in the buffer memory in circuit 126.

A value of a phase-shift to be applied to the reception signal to compensate for the first delay $\delta_{clex}$ is then computed due to elements 130 and 132 (step 304).

The computed phase-shift value is then stored in LUT 134, where this phase-shift value is associated with the amplitude value of the reception signal (step 306).

During a step 308, the amplitude value of the reception signal is compared with a maximum amplitude value of the reception signal. If the amplitude value of the reception signal is lower than this maximum value, the amplitude of the reception signal is increased (step 310) and steps 302 to 308 are repeated. The amplitude of the reception signal is, for example, increased by a value corresponding to a gain pitch of VGA 112. If the amplitude value of the reception signal is equal to the maximum value, the calibration method ends (step 312). The maximum amplitude value of the reception signal is for example in the range from 10 V to 30 V. Further, steps 302 to 308 may be repeated X times, with X an integer number in the range from 10 to 20.

The implementation of this calibration method thus enables to store in LUT 134 phase-shift values to be applied to the reception signal to compensate for the delay due to the process variations of receive circuit 110 and to the amplitude of the reception signal.

As a variant, the method of calibration of device 100 may comprise other steps and/or steps different from those described hereabove. For example, to compensate, in addition to the delay due to the process variations of receive circuit 110, for the delay due to the voltage and/or temperature variations of receive circuit 110 (which is however much lower than that due to process variations), the method of calibration of device 100 may comprise a repetition of the previously-described steps for different values of the power supply voltage of device 100 and/or of the temperature of device 100.

Figure 4:
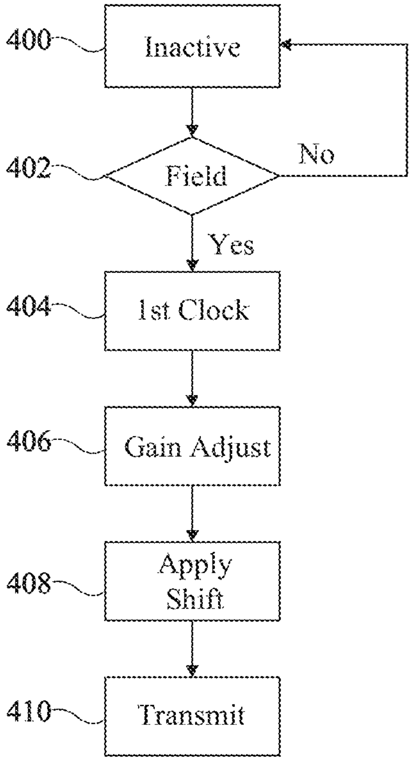
FIG. 4 schematically shows steps of an example of a method of communication of a device of contactless communication by active load modulation with a reader.

FIG. 4 schematically shows the steps of an example of a method of communication of device 100 with reader 200.

Device 100 may be in an inactive state (step 400).

During a step 402, device 100 verifies whether an electromagnetic field corresponding to a communication is detected.

In the absence of such an electromagnetic field, device 100 is held in the inactive state (return to step 400).

In the presence of such an electromagnetic field, the first clock signal is delivered by receive circuit 110, which receives as an input the reception signal originating from the electromagnetic field received by antenna 102 (step 404).

The gain of VGA 112 may be adjusted by compensation circuit 118, this gain value being a function of the amplitude of the reception signal (step 406).

A phase-shift value is then applied by compensation circuit 118, for example as an input of PLL 120, where this phase-shift value may correspond to one of those stored in LUT 134 for the amplitude value of the reception signal (step 408). PLL 120 may then take into account this phase-shift value and compensate for the first delay in the signal applied to the input of transmit circuit 116.

A modulation signal, in phase with the reception signal, is then obtained at the output of transmit circuit 116 and applied to antenna 102, allowing the communication between device 100 and reader 200 (step 410).

Figure 5:
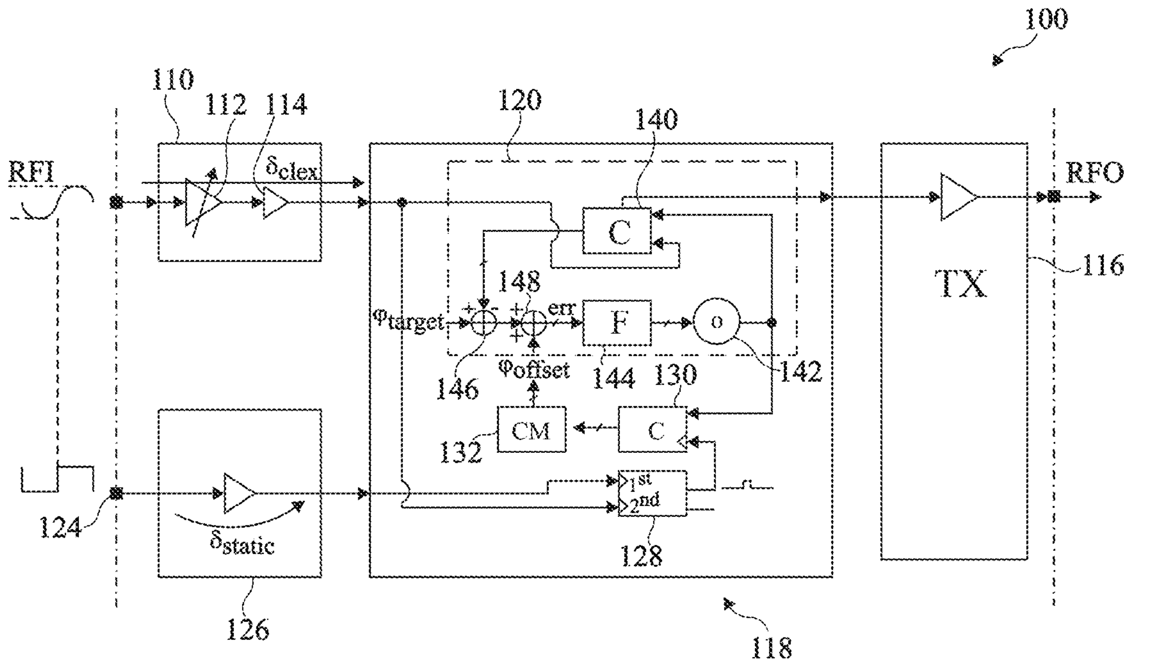
FIG. 5 schematically shows details of an example of a device of contactless communication by active load modulation.

The example of device 100 is described hereafter in relation with FIG. 5. In FIG. 5, only part of the components and circuits of device 100 are shown and described hereafter. For example, as compared with FIG. 1, the antenna 102 and the circuit 104 of device 100 are not shown in FIG. 5. Further, the circuits 134, 136, 138 previously described in relation with FIG. 2 are not shown in FIG. 5.

As compared with the device 100 previously described in relation with FIG. 2, an example of PLL 120 is detailed in FIG. 5.

In the example of FIG. 5, PLL 120 comprises a counter (C) 140, an oscillator (O) 142, a filter (F) 144, and a subtractor 146, and an adder 148.

In this example, counter 140 comprises a clock input coupled to the output of receive circuit 110, a data input coupled to an output of oscillator 142 which corresponds to the second output of the PLL 120 previously described in relation with FIG. 2, and an output coupled to a negative input of subtractor 146 and having a counting value delivered thereon. Counter 140 also delivers, on another output, the input signal of transmit circuit 116.

A target phase value, referred to as "$\varphi_{target}$", is applied to a positive input of subtractor 146. This value $\varphi_{target}$ may correspond to a predetermined value, for example stored in a register of device 100, and which for example corresponds to the expected phase-shift, considering the delay due to the different elements and circuits of device 100 without taking into account the delay due to the PVT variations of receive circuit 110 and to the amplitude of the reception signal.

The output of subtractor 146 is coupled to a first input of adder 148 and phase-shift value $\varphi_{target}$ is applied to a second input of adder 148.

The output of adder 148 is coupled to the input of filter 144, and the output of filter 144 is coupled to the input of oscillator 142.

According to an example, oscillator 142 may be of Digital Controlled Oscillator (DCO) type.

According to an example, the frequency of the periodic signal delivered by oscillator 142 may be equal to approximately 868 MHz (64*13.56 MHz), and those of the input signal of transmit circuit 116 delivered by counter 140 and of the reception signal and of the first clock signal equal to 13.56 MHz.

As a variant, PLL 120 may comprise circuits and/or components different from those described hereabove and shown in FIG. 5.

Figure 6:
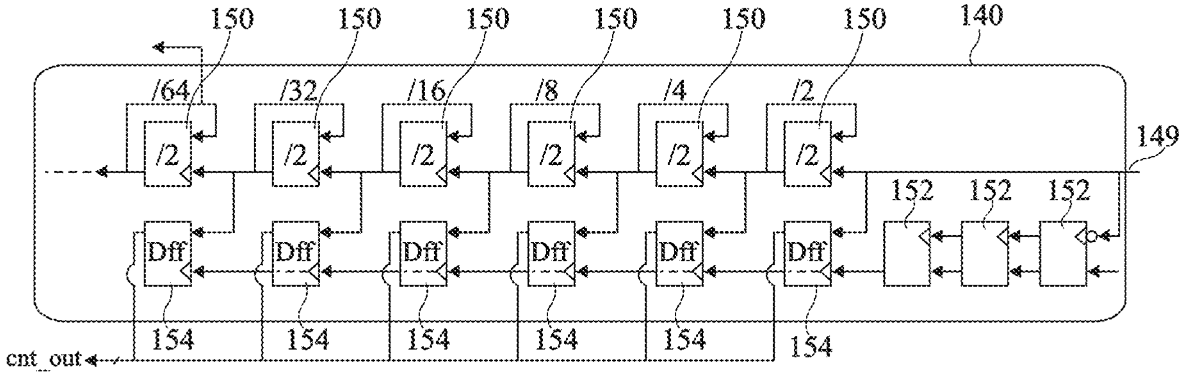
FIG. 6 schematically shows an example of a counter of a phase-locked loop of a device of contactless communication by active load modulation.

An example embodiment of counter 140 is shown in FIG. 6.

In this example, counter 140 comprises an input 149 having the output signal of oscillator 142 applied thereto. Counter 140 comprises, on the example of FIG. 6, also has a plurality of frequency dividers 150 series-coupled to one another such that the output of each of these dividers is coupled to the clock input of the next divider. In this example, the output signal of oscillator 142 is applied to the clock input of the first divider 150. Further, the output signal of one of dividers 150 corresponds to the input signal of transmit circuit 116. In this example, frequency dividers 150 are configured to divide by a factor 2 the frequency of the signal received on their input. Thus, in the described example, it being given that the ratio of the frequency of the periodic signal delivered by oscillator 142 to that of the input signal of transmit circuit 116 is equal to 64, the input signal of transmit circuit 116 is obtained at the output of the $6^{th}$ divider 150 ($2^6$=64). Further, in a specific configuration, each of dividers 150 configured to divide by a factor 2 the frequency of the signal received on their input may be formed by a D flip-flop having its output looped back on its input via an inverter.

In this example, counter 140 further comprises a plurality of flip-flops 152 (3 D-type flip-flops in FIG. 6) series-coupled to one another so that the output of each of flip-flops 152 is coupled to the data input of the next flip-flop 152. The output signal of oscillator 142 is here applied to the clock input of each of flip-flops 152. The first clock signal delivered by receive circuit 110 is applied to the data input of the first flip-flop 152. These flip-flops 152 enable to avoid the occurrence of a metastability in counter 140.

In the described example, counter 140 also comprises other D-type flip-flops 154 series-coupled to one another so that the clock inputs of these flip-flops 154 are coupled to one another. The first one of these flip-flops 154 receives on its clock input the output signal of the last one of flip-flops 152, and on its data input the output signal of oscillator 142. The other flip-flops 154 receive on their data input the output signals of dividers 150. The output signals of flip-flops 154 form together the counting signal (called "cnt_out" in FIG. 6) which is coded in binary form in this example (the output signal of each of flip-flops 154 corresponding to a bit of this counting signal).

As a variant, counter 140 may be formed with elements and/or components different from those described hereabove and shown in FIG. 6.

Figure 7:
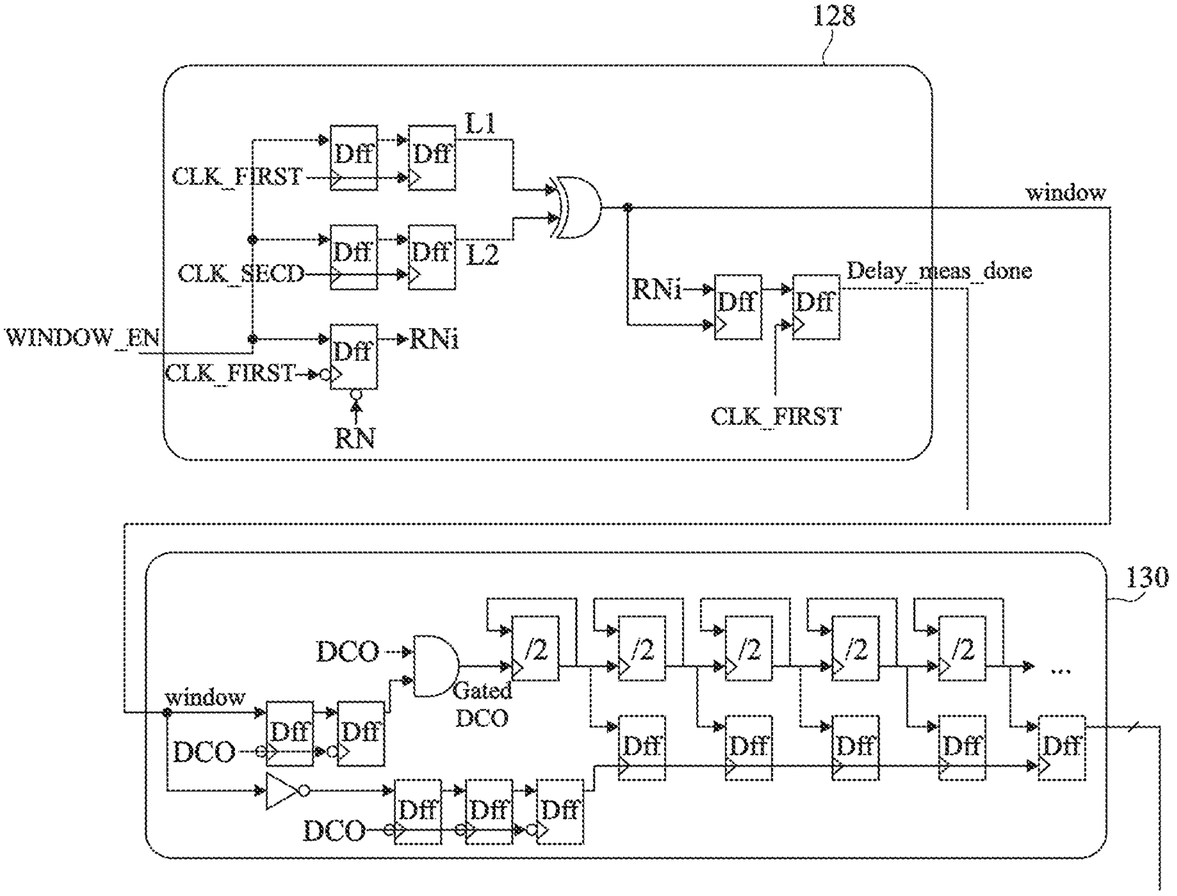
FIG. 7 schematically shows an example of a counting trigger circuit and of a counter forming part of a device of contactless communication by active load modulation.

An example embodiment of counting trigger circuit 128 and of counter 130 is shown in FIG. 7. A timing diagram of the signals used in these circuits 128, 130 is also shown in FIG. 8.

Figure 8:
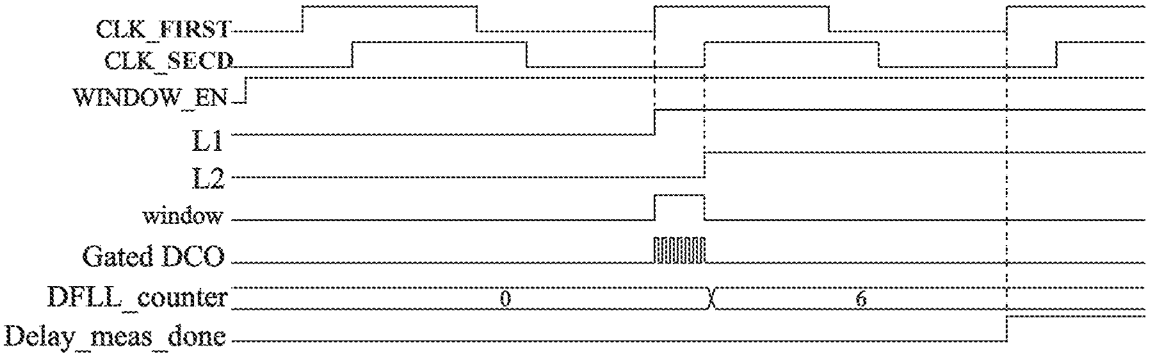
FIG. 8 shows a timing diagram of examples of signals used in the circuits of FIG. 7.

In FIGS. 7 and 8, the following captions are used:

CLK_FIRST: clock signal previously called second clock signal;

CLK_SECD: clock signal previously called first clock signal;

Window: counting trigger signal;

WINDOW_EN: signal for activating counting trigger circuit 128;

DCO: output signal of oscillator 142;

Gated DCO: Output signal of the gate and of the counter 130 shown in FIG. 7;

DFLL_counter: output signal of counter 130;

Delay_meas_done: signal delivered at the output of circuit 128 and indicating that the counting is complete and can be read at the output of circuit 130;

RN: signal resetting the D flip-flops when its value is at state 0, and letting the D flip-flops operate at each clock edge when its value is at state 1; and Rni: end-of-measurement indication signal.

In FIG. 7, blocks "Dff" correspond to D flip-flops, and blocks "/2" correspond to frequency dividers applying a division factor equal to 2.

The details of operation of the circuits 128 and 130 shown in FIG. 7 are not described herein, those skilled in the art will understand the operation of these circuits based on the components and wirings shown in FIG. 7 as well as based on the timing diagram of FIG. 8. Further, the signals of the timing diagram of FIG. 8 are schematically shown and out of scale with respect to one another, for the amplitudes as well as for the durations of the different portions of these signals.

In the different examples, the device 100 provided can enable to implement a calibration method used, during a subsequent use of the device to communicate with a reader, to compensate for the delay due to at least part of the PVT variations of the receive circuit 110 of device 100 and to the amplitude of the reception signal received as an input of receive circuit 110. The different elements of device 100 may in particular allow: a synchronization of a clock signal (first clock signal in the above disclosure), for example corresponding to a square signal, with no delay variation with a reception signal, for example corresponding to a sinusoidal signal, having an amplitude that may vary; a measurement of the delay between the reception signal and the first clock signal originating from the reception signal; a use of a PLL as an accurate time base to automatically perform a measurement of the delay occurring in the device, and to calibrate the device to compensate for this delay; and a storage, for example in a lookup table, of phase-shift values enabling to compensate for different delay values, according to the amplitude of the reception signal, which may depend on the gain of the variable gain amplifier.

In all the examples, the device may perform an accurate compensation of the first extracted clock signal according to the input amplitude of the reception signal.

In all the examples, the provided device may facilitate contactless communications between the device and a reader, authorizing the device to have a small antenna and/or a low power and/or a large distance between the device and the reader.

In all the examples, the compensation of the delay by the device may be achieved without using an external device to measure the delays, and/or without having to deliver as an output one or a plurality of measurement signals, since this compensation can be performed within the device.

In all the examples, the device may comprise counters to automatically perform delay measurements.

In all the examples, due to the achieved delay compensation, the phase of the signal transmitted by the device remains stable even when the amplitude of the electromagnetic field received by the device varies, which results in an resulting electromagnetic field where the amplitude levels are clearly distinct and different from one another.

In the above disclosure, device 100 corresponds to a device of contactless communication by active load modulation which is, during a communication with a reader, in card emulation mode. Device 100 may be provided with functionalities other than those described hereabove. Device 100 may for example correspond to a cell phone or a connected object such as a watch.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

The invention claimed is:

1. A device of contactless communication by active load modulation, comprising:

a receive circuit configured to receive a reception signal originating from an electromagnetic field intended to be received by an antenna and to generate a first clock signal;

a transmit circuit comprising an output coupled to the antenna and intended to deliver a modulation signal in phase with the reception signal; and a compensation circuit configured to compensate for a first delay of the first clock signal due to the receive circuit and to an amplitude of the reception signal, wherein the compensation circuit is configured to determine a phase-shift value to be applied to an input signal of the transmit circuit to compensate for the first delay; and wherein the compensation circuit comprises at least one phase difference measurement circuit configured to measure a phase difference between the first clock signal and a second clock signal synchronous with the reception signal.

2. The device according to claim 1, wherein the receive circuit comprises:

a variable gain amplifier configured to receive the reception signal; and a converter circuit configured to convert a sinusoidal signal into a square signal, the converter circuit having an input coupled to an output of the variable gain amplifier, and an output generating the first clock signal.

3. The device according to claim 2, wherein the compensation circuit comprises at least one lookup table configured to store a plurality of phase-shift values each associated with an amplitude value of the reception signal, and to generate one of the phase-shift values according to a value of a control signal applied to the input of the lookup table and having its value depending on the amplitude of the reception signal, and wherein the compensation circuit further comprises:

an analog-to-digital converter comprising an input coupled to the output of the variable gain amplifier;

a first computing circuit comprising an input coupled to an output of the analog-to-digital converter, and configured to determine the amplitude value of the reception signal and to generate the control signal having a value depending on the determined amplitude value of the reception signal.

4. The device according to claim 3, wherein an output of the first computing circuit is coupled to a gain control input of the variable gain amplifier.

5. The device according to claim 1, further comprising a phase-locked loop configured to receive the first clock signal and the phase-shift value, and to generate at a first output the input signal of the transmit circuit.

6. The device according to claim 5, wherein the compensation circuit comprises at least one circuit for measuring a phase difference between the first clock signal and a second clock signal synchronous with the reception signal, and wherein the measurement circuit comprises at least:

a counting trigger circuit comprising two inputs having the first and second clock signals intended to be applied thereto, and configured to generate a counting trigger signal having a first value for a time period equal to the first delay and a second value, different from the first value, outside of this time period;

a counter comprising a clock input coupled to an output of the counting trigger circuit, and a data input coupled to a second output of the phase-locked loop on which a periodic signal having a frequency equal to a multiple of the input signal of the transmit circuit is intended to be delivered; and a second computing circuit configured to determine the phase-shift value according to a value of a counting signal intended to be delivered by the counter.

7. The device according to claim 6, wherein the compensation circuit further comprises a buffer memory circuit configured to receive the second clock signal and comprising an output coupled to one of the two inputs of the counting trigger circuit.

8. The device according to claim 1, wherein the compensation circuit comprises at least one lookup table configured to store a plurality of phase-shift values each associated with an amplitude value of the reception signal, and to deliver one of the phase-shift values according to a value of a control signal applied to the input of the lookup table and having its value depending on the amplitude of the reception signal.

9. A method of calibration of a device according to claim 1, comprising at least the implementation of the following steps:

a) applying a reception signal at an input of the receive circuit of the device;

b) computing and storing, by the compensation circuit of the device, of a phase-shift value which is a function of the amplitude of the reception signal; and wherein steps a) and b) are repeated a plurality of times by modifying, at each repetition, an amplitude value of the reception signal.

10. The method according to claim 9, wherein steps a) and b) are repeated by scanning a range of amplitude values of the reception signal ranging from a minimum value to a maximum value expected for this amplitude.

11. The method according to claim 9, wherein, for each amplitude value of the reception signal, steps a) and b) are repeated a plurality of times by modifying, at each repetition, a value of a power supply voltage of the device.

12. The method according to claim 9, wherein, for each amplitude value of the reception signal, steps a) and b) are repeated a plurality of times by modifying, at each repetition, a value of a temperature of the device.

13. A method of contactless communication between a reader and a device according to claim 1, comprising at least the implementation of the following steps:

detecting an electromagnetic field by the device;

when an electromagnetic field is detected by the device, transmitting a first clock signal by the receive circuit of the device receiving as an input a reception signal originating from the electromagnetic field;

applying, by the compensation circuit of the device, a phase-shift value on a signal applied at the input of the transmit circuit of the device, the applied phase-shift value being intended to compensate for a first delay of the first clock signal due to the receive circuit and to the amplitude of the reception signal and being dependent on the amplitude of the reception signal; and applying to the antenna, by the transmit circuit of the device, a modulation signal in phase with the reception signal.

14. The method according to claim 13, wherein the receive circuit of the device comprises at least a variable gain amplifier configured to receive as an input the reception signal, and further comprising, before the application of the phase-shift value to the signal applied at the input of the transmit circuit of the device, controlling the gain of the variable gain amplifier by the compensation circuit, the selected value of the gain being a function of the amplitude of the reception signal.

* * * * *